United States Patent
Ji et al.

(10) Patent No.: US 11,794,173 B2
(45) Date of Patent: Oct. 24, 2023

(54) COMPOSITE PHOTOCATALYST STRUCTURE, AND PHOTOCATALYTIC FILTER AND AIR PURIFICATION DEVICE INCLUDING THE SAME

(71) Applicants: Samsung Electronics Co., Ltd., Suwon-si (KR); Myongji University Industry and Academia Cooperation, Yongin-si (KR)

(72) Inventors: Sangmin Ji, Yongin-si (KR); Hyukjae Kwon, Suwon-si (KR); Minseok Koo, Suwon-si (KR); Sukeun Kuk, Suwon-si (KR); Dongsik Yang, Seoul (KR); Hyun Chul Lee, Ansan-si (KR); Joeng Gil Seo, Seoul (KR); Namjun So, Seoul (KR)

(73) Assignees: SAMSUNG ELECTRONICS CO., LTD., Gyeonggi-Do (KR); MYONGJI UNIVERSITY INDUSTRY AND ACADEMIA COOPERATION, Gyeonggi-Do (KR)

( * ) Notice: Subject to any disclaimer, the term of this patent is extended or adjusted under 35 U.S.C. 154(b) by 156 days.

(21) Appl. No.: 17/387,448

(22) Filed: Jul. 28, 2021

(65) Prior Publication Data
US 2022/0280923 A1 Sep. 8, 2022

(30) Foreign Application Priority Data
Mar. 8, 2021 (KR) .................. 10-2021-0030419

(51) Int. Cl.
*B01J 27/00* (2006.01)
*B01J 27/08* (2006.01)
(Continued)

(52) U.S. Cl.
CPC ............ *B01J 27/08* (2013.01); *B01D 53/885* (2013.01); *B01J 21/063* (2013.01); *B01J 35/004* (2013.01);
(Continued)

(58) Field of Classification Search
None
See application file for complete search history.

(56) References Cited

U.S. PATENT DOCUMENTS 7,607,294 B2 10/2009 Son
7,795,173 B2 9/2010 Vanderspurt et al.
(Continued)

FOREIGN PATENT DOCUMENTS

CN 103252244 A * 8/2013
CN 103908972 A 7/2014
(Continued)

OTHER PUBLICATIONS

CN-103252244-A—English translation (Year: 2013).*
(Continued)

*Primary Examiner* — Stefanie J Cohen
(74) *Attorney, Agent, or Firm* — CANTOR COLBURN LLP (57) ABSTRACT

A composite photocatalyst, a photocatalytic filter for air purification, and an air purification device that includes the photocatalytic filter. The composite photocatalyst includes: a first metal oxide particle; and second metal oxide particles arranged on a surface of the first metal oxide particle, wherein specific surface area of the second metal oxide particles is greater than specific surface area of the first metal oxide particle, and bandgap energy of the second metal oxide particles is greater than bandgap energy of the first metal oxide particle. The composite photocatalyst structure may degrade and remove gaseous pollutants under room
(Continued)

temperature and atmospheric pressure conditions. The composite photocatalyst may be applied to various indoor and outdoor air purification systems in the form of a photocatalytic filter.

17 Claims, 7 Drawing Sheets

(51) Int. Cl.
  *B01J 21/06* (2006.01)
  *B01J 35/00* (2006.01)
  *B01J 35/10* (2006.01)
  *B01J 35/02* (2006.01)
  *B01D 53/88* (2006.01)

(52) U.S. Cl.
  CPC ....... *B01J 35/0033* (2013.01); *B01J 35/0066* (2013.01); *B01J 35/026* (2013.01); *B01J 35/1014* (2013.01); B01D 2255/2096 (2013.01); B01D 2255/20707 (2013.01); B01D 2255/802 (2013.01); B01D 2255/9202 (2013.01); B01D 2255/9207 (2013.01)

(56) References Cited

U.S. PATENT DOCUMENTS

| | | | |
|---|---|---|---|
| 8,961,895 | B2 | 2/2015 | Freedman et al. |
| 10,538,434 | B2 | 1/2020 | Takeuchi et al. |
| 10,842,905 | B2 | 11/2020 | Baek |
| 2001/0022290 | A1 | 9/2001 | Shiota et al. |
| 2006/0000259 | A1* | 1/2006 | Rothschild ........... G01N 27/125 73/31.06 |
| 2006/0283701 | A1* | 12/2006 | Li ........................ B01J 35/004 204/157.52 |
| 2010/0051443 | A1* | 3/2010 | Lee ........................ B01J 21/063 502/4 |
| 2014/0060400 | A1 | 3/2014 | Park et al. |
| 2015/0118138 | A1 | 4/2015 | Jung et al. |
| 2021/0094026 | A1 | 4/2021 | Kwon et al. |

FOREIGN PATENT DOCUMENTS

| | | |
|---|---|---|
| CN | 103920509 B | 12/2015 |
| CN | 104785280 A | 9/2017 |
| CN | 107262121 A | 10/2017 |
| EP | 0715878 A1 | 6/1996 |
| JP | 1999033344 A | 2/1999 |
| JP | 4345363 B2 | 10/2009 |
| KR | 19960010047 A | 4/1996 |
| KR | 1020040063390 A | 7/2004 |
| KR | 10-2005-0064697 A | 6/2005 |
| KR | 1020060115939 A | 11/2006 |
| KR | 101339919 B1 | 12/2013 |
| KR | 101435587 B1 | 8/2014 |
| KR | 1020150050479 A | 5/2015 |
| KR | 1020150056498 A | 5/2015 |
| KR | 101740281 B1 | 5/2017 |
| KR | 101853757 B1 | 5/2018 |
| KR | 1020190024390 A | 3/2019 |

OTHER PUBLICATIONS

English Abstract of CN 103908972.
English Abstract of CN 103920509.
English Abstract of CN 104785280.
English Abstract of CN 107262121.
English Abstract of KR 10-2005-0064697.
Chi-Yuan Lu et al. "Simultaneous removal of VOC and NO by activated carbon impregnated with transition metal catalysts in combustion flue gas," Fuel Processing Technology, Elsevier BV, May 7, 2007, pp. 557-567, vol. 88, No. 6.
Extended EP Search Report dated Aug. 3, 2021 of EP Patent Application No. 21156211.1.
Fei Tian et al. "Photodegradation of formaldehyde by activated carbon loading TiO2 synthesized via microwave irradiation", Korean Journal of Chemical Engineering, Springer New York LLC, Feb. 23, 2015, pp. 1333-1339, vol. 32, No. 7.
Zhen-Shu Liu et al. "Activated carbon fibers impregnated with Pd and Pt catalysts for toluene removal," Journal of Hazardous Materials, Elsevier, Apr. 21, 2013, pp. 49-55, vol. 256.

* cited by examiner

COMPOSITE PHOTOCATALYST STRUCTURE, AND PHOTOCATALYTIC FILTER AND AIR PURIFICATION DEVICE INCLUDING THE SAME

CROSS-REFERENCE TO RELATED APPLICATION

This application is based on and claims priority under 35 U.S.C. § 119 to Korean Patent Application No. 10-2021-0030419, filed on Mar. 8, 2021, in the Korean Intellectual Property Office, the content of which is herein incorporated by reference in its entirety.

BACKGROUND

1. Field

The present disclosure relates to a composite photocatalyst, and photocatalytic filters and air purification devices including the composite photocatalyst.

2. Description of the Related Art

Recently, interest in indoor and outdoor air quality has been increasing. Particularly, as gaseous pollutants such as volatile organic compounds (VOCs), which are known as substances that may cause sick building syndrome, it has become necessary to manage or control the levels of such gaseous pollutants, particularly with indoor environments.

The most common methods used to remove gaseous pollutants from air are directed towards adsorbing and removing gaseous pollutants using a filter having an adsorption layer filled with adsorption materials with a relatively large specific surface area and numerous pores or high porosity. In addition, techniques of oxidatively degrading gaseous pollutants into harmless substances such as water and carbon dioxide at a high temperature using a catalyst material capable of degrading the gaseous pollutants under high-temperature conditions have been widely used.

However, due to the technical limits in adsorption capacity of adsorbent technology for the removal of gaseous pollutants, a process of replacing traditional adsorbents with new adsorbent materials or new adsorbent material capable of regenerating the adsorbents when the adsorption capacity reaches a maximum level is of interest. The process of regenerating the adsorbents includes a desorption process of the pollutants adsorbed on the material adsorbents by heating the material at a high temperature. In this case, however, a problem of secondary pollution caused by the detached pollutants may occur. In addition, a large amount of energy may be consumed in the desorption process, and there may be a risk of the stated secondary pollution.

In catalytic degradation technology, many catalysts require a relatively high temperature of 100° C. to 200° C. or higher be maintained to obtain high oxidative degradation efficiency. As a result, such catalyst systems require or consume a large amount of energy, and operating conditions or environments are limited.

Therefore, there is a need to develop an adsorption technology capable of continuously removing gaseous pollutants from a low concentration to a high concentration under at or near room temperature and atmospheric pressure conditions, and preferably, with no or minimal secondary pollution caused by desorption of the adsorbed pollutants or without excessive energy consumption during operation.

SUMMARY

Provided is a composite photocatalyst capable of degrading and removing gaseous pollutants from air, e.g., indoor or outdoor environments, and having improved photocatalytic reactivity at or near room temperature and atmospheric pressure conditions.

A Composite Photocatalyst Includes:

a first metal oxide particle; and a second metal oxide particle arranged on a surface of the first metal oxide particle, wherein a specific surface area of the second metal oxide particle is greater than a specific surface area of the first metal oxide particle, and a bandgap energy of the second metal oxide particle is greater than a bandgap energy of the first metal oxide particle.

Provided are photocatalytic filters including the composite photocatalyst.

Provided are air purification devices including the photocatalytic filters.

Additional aspects will be set forth in part in the description which follows and, in part, will be apparent from the description, or may be learned by practice of the presented embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The invention and embodiments will be described more fully hereinafter, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain certain aspects.

The present disclosure allows for various changes and numerous embodiments, and in particular, embodiments will be illustrated in the drawings and described in detail. However, this is not intended to limit the present disclosure to particular modes of practice, and it is to be appreciated that all changes, equivalents, and substitutes that do not depart from the spirit and technical scope of the present invention are encompassed in the present disclosure.

An expression used in the singular encompasses the expression of the plural, unless it has a clearly different meaning in the context. Hereinafter, it is to be understood that the terms such as "including" or "having" are intended to indicate the existence of features, numbers, operations, components, parts, elements, materials, or combinations thereof disclosed in the specification, and are not intended to preclude the possibility that one or more other features, numbers, operations, components, parts, elements, materials, or combinations thereof may exist or may be added.

In the drawings, thicknesses of various layers and regions may be enlarged or reduced for clarity. Throughout the specification, it will be understood that when one element such as layer, film, region, or plate, is referred to as being "on" another element, it may be directly on the other element, or intervening elements may also be present therebetween. It will be understood that, although the terms first, second, third, etc. may be used herein to describe various components, these components should not be limited by these terms. These terms are only used to distinguish one component from another.

The term "or" refers to "and/or" unless otherwise stated. As used herein, the term "and/or" includes any and all combinations of one or more of associated listed items. It will be further understood that the terms "comprise" and/or "comprising" or "include" and/or "including" when used in this specification, specify the presence of stated features, regions, integers, steps, operations, and elements.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±5% of the stated value.

Unless otherwise defined, all terms (including technical and scientific terms) used herein have the same meaning as commonly understood by one or ordinary skill in the art to which this application belongs. Also, it will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to schematic cross-sectional views of ideal embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the actual shape of a region of a device and are not intended to limit the scope of claims.

A composite photocatalyst, and a photocatalytic filter, and an air purification device including the composite photocatalyst according to exemplary embodiments is described in more detail. A composite photocatalyst according to an embodiment has a structure that includes a first metal oxide particle, a second metal oxide particle arranged on a surface of the first metal oxide particle, wherein a specific surface area of the second metal oxide particle is greater than that of the first metal oxide particle, and a bandgap energy of the second metal oxide particle is greater than that of the first metal oxide particle.

The composite photocatalyst and its structure includes the first metal oxide particle and the second metal oxide particle, as photocatalysts having different specific surface areas and different bandgap energies, wherein the second metal oxide particle having greater specific surface area is arranged on the surface of the first metal oxide particle, and the bandgap energy of the second metal oxide particle is higher than that of the first metal oxide particle.

Figure 1:
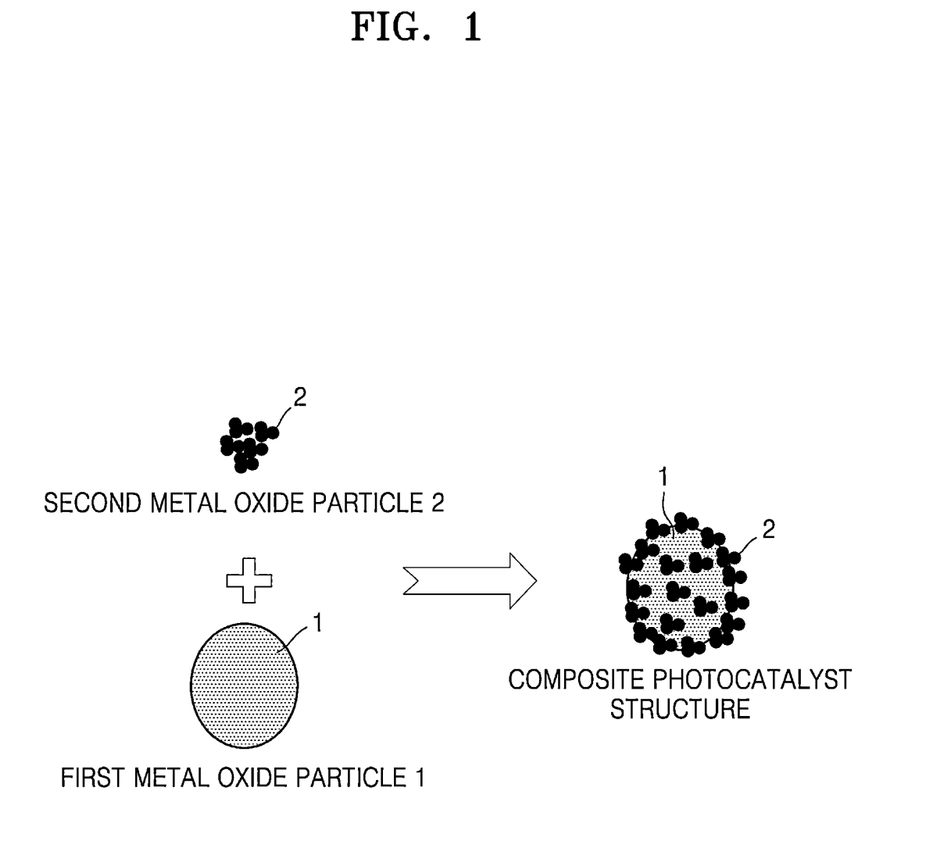
FIG. 1 is a schematic representation of a composite photocatalyst structure according to an embodiment.
Figure 2:
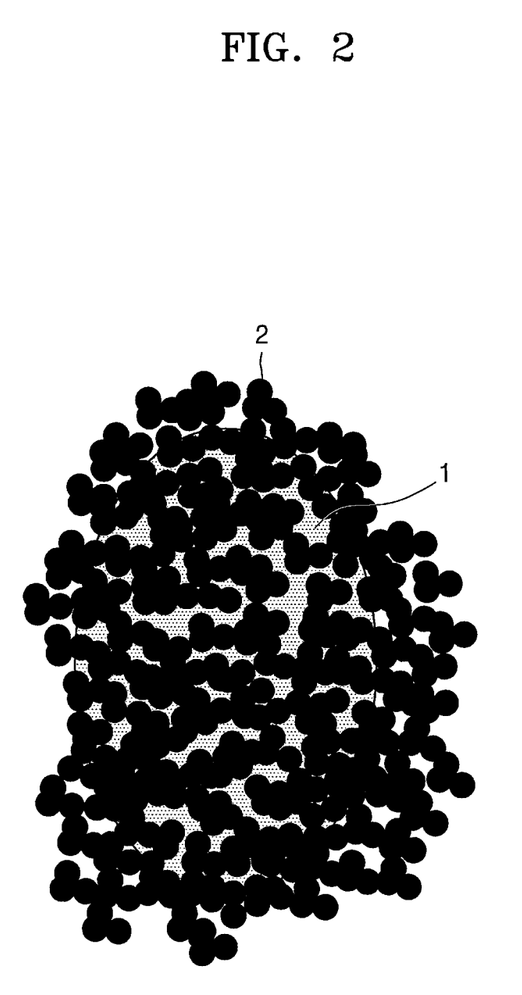
FIG. 2 is a schematic representation of a composite photocatalyst structure according to an embodiment.

FIGS. 1 and 2 are schematic representations of a composite photocatalyst and its structure of an embodiment. As shown in FIGS. 1 and 2, the composite photocatalyst has a structure in which a second metal oxide particle 2, preferably a plurality of metal oxide particles 2 surrounds a first metal oxide particle 1, the second metal oxide particle 2 or plurality thereof having a greater specific surface area and a greater bandgap energy than that of the first metal oxide particle 1.

Figure 3A:
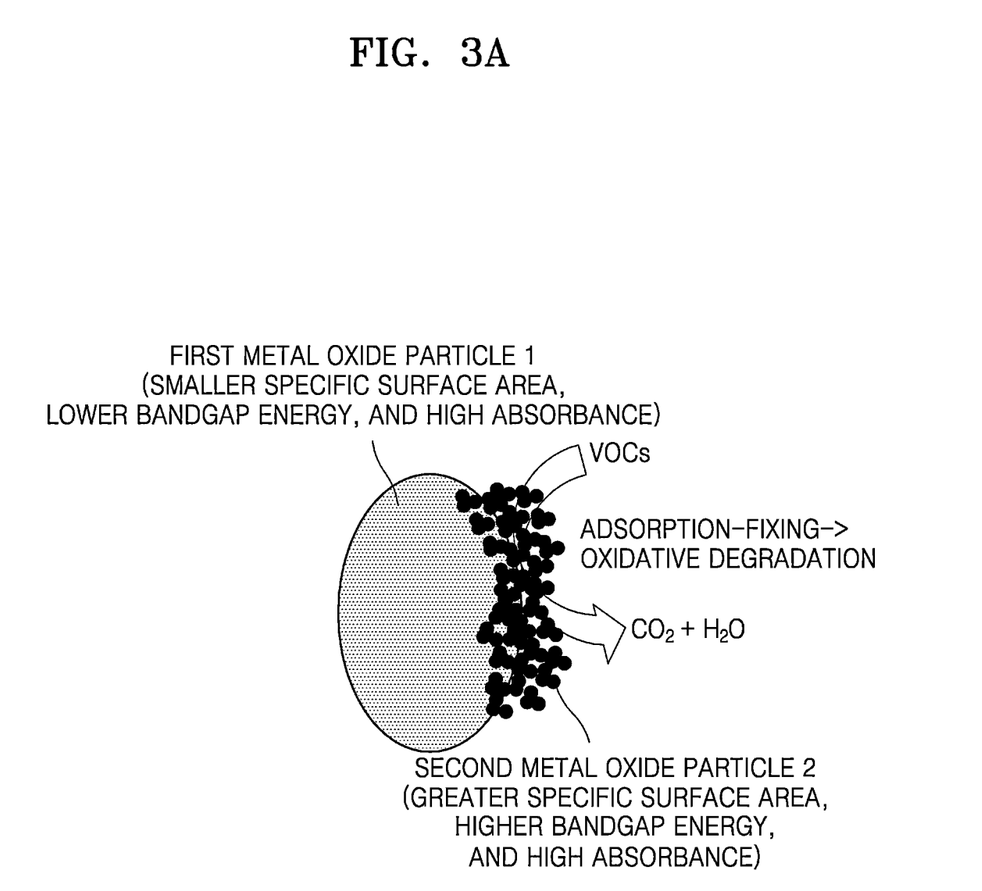
FIGS. 3A and 3B are schematic representations of an operational mode of action of a composite photocatalyst according to an embodiment.
Figure 3B:
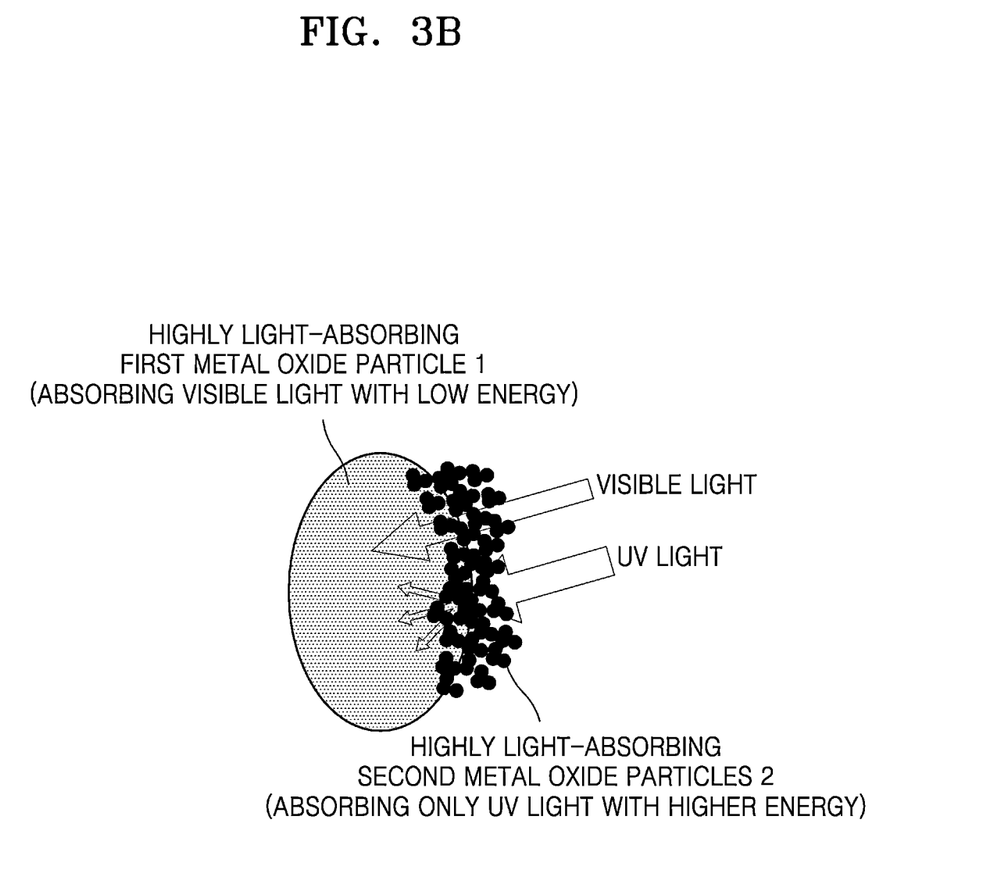

FIGS. 3A and 3B are schematic representations for describing a possible operational mode of action of the composite photocatalyst and structure according to an embodiment.

Referring to FIGS. 3A and 3B, the second metal oxide particles 2 having a greater specific surface area may adsorb and fix pollutants in the air at room temperature and may oxidatively degrade the pollutants via a photocatalytic reaction due to the relatively high bandgap energies. For example, the second metal oxide particles 2 may have a bandgap energy greater than 3 electron Volts (eV). The second metal oxide particles 2 having a bandgap energy greater than 3 eV absorb ultraviolet (UV) light, which in turn, may induce a photocatalytic reaction and act as reaction sites in the composite photocatalyst.

Examples of the second metal oxide particles 2 may include at least one metal oxide of titanium (Ti), zinc (Zn), zirconium (Zr), tantalum (Ta), niobium (Nb), or an alloy of metal oxides thereof. In addition, the metal oxide included in the second metal oxide particles 2 may be undoped, or the metal oxide included in the second metal oxide particles 2 may be doped selectively with a halogen, nitrogen, sulfur, carbon, or any combination thereof.

Specifically, for example, the second metal oxide particle 2 may include $TiO_2$.

The first metal oxide particle 1 has a smaller bandgap energy than the second metal oxide particles 2, and is surrounded by the second metal oxide particles 2 having a greater specific surface area. The first metal oxide particle 1 may generate charge by absorbing light that has passed through or scattered without being absorbed by the second metal oxide particles 2 positioned at the surface of the first metal oxide particle 1, thereby improving the reactivity of the second metal oxide particles 2.

For example, the first metal oxide particle 1 may have a bandgap energy lower than 3 eV. The first metal oxide particle 1 having a bandgap energy lower than 3 eV may absorb visible light of relatively lower energy. The first metal oxide particle 1 may induce photocatalytic reaction by absorbing even visible light at a lower energy.

Examples of the first metal oxide particle 1 may include at least one metal oxide of bismuth (Bi), vanadium (V), tungsten (W), iron (Fe), copper (Cu), nickel (Ni), silver (Ag), and an alloy metal oxide thereof.

In addition, the metal oxide included in the first metal oxide particle 1 may be undoped, or the first metal oxide particle 1 may be doped with a halogen, nitrogen, sulfur, carbon, or any combination thereof.

For example, the metal oxide included in the first metal oxide particle 1 may be, selectively, doped with a halogen.

Specifically, for example, the first metal oxide particles 1 may include a metal oxide represented by Formula 1.

$$BiOX \qquad \text{Formula 1}$$

In Formula 1, X is a halogen.

For example, in Formula 1, X may be a halogen such as chlorine (Cl), bromine (Br), iodine (I), or any combination thereof.

The composite photocatalyst according to an embodiment may have a structure in which the first metal oxide particle 1 is surrounded by the second metal oxide particles 2 as shown in FIG. 2.

According to an embodiment, the specific surface areas of the first metal oxide particles 1 may be about 100 square meters per gram ($m^2/g$) or less, for example, about 90 $m^2/g$ or less, about 80 $m^2/g$ or less, about 70 $m^2/g$ or less, about 60 $m^2/g$ or less, about 50 $m^2/g$ or less, about 40 $m^2/g$ or less, about 30 $m^2/g$ or less, about 20 $m^2/g$ or less, about 10 $m^2/g$ or less, about 5 $m^2/g$ or less, about 3 $m^2/g$ or less, or about 1 $m^2/g$ or less. Due to the specific surface area within the above-described ranges, the first metal oxide particle 1 may serve as a support on which the second metal oxide particles 2 are arranged. A lower limit of the specific surface area of the first metal oxide particle 1 is not particularly limited, but the specific surface area may be, for example, about 0.1 $m^2/g$ or more.

The specific surface area of the second metal oxide particles 2 may be about 10 $m^2/g$ or more, for example about 20 $m^2/g$ or more, about 50 $m^2/g$ or more, about 100 $m^2/g$ or more, about 160 $m^2/g$ or more, about 170 $m^2/g$ or more, about 180 $m^2/g$ or more, about 190 $m^2/g$ or more, about 200 $m^2/g$ or more, about 210 $m^2/g$ or more, about 220 $m^2/g$ or more, about 230 $m^2/g$ or more, about 240 $m^2/g$ or more, or about 250 $m^2/g$ or more. Due to the specific surface area within the above-described ranges, the second metal oxide particles may adsorb and fix pollutants in the air with a high adsorptivity. An upper limit of the specific surface area of the second metal oxide particles 2 is not particularly limited, but the specific surface area may be, for example, about 1600 $m^2/g$ or less.

An average particle diameter of the first metal oxide particle 1 may be from about 0.5 micrometers (μm) to about 50 μm. A lower limit of the average particle diameter of the first metal oxide particle 1 may be, for example, about 0.5 μm, about 1 μm, about 2 μm, about 5 μm or about 10 μm. An upper limit of the average particle diameter of the first metal oxide particle 1 may be, for example, about 40 μm, about 30 μm, about 20 μm, or about 10 μm. A range of average particle diameter of the first metal oxide particle 1 may be determined by combining a stated lower limit and a stated upper limit. For example, the average particle diameter of the first metal oxide particle 1 may be determined in the range of about 0.5 μm to about 50 μm, e.g., from about 0.5 μm to about 1 μm, from about 2 μm to about 9 μm, or from about 10 μm to about 30 μm. Within the ranges, the first metal oxide particle 1 may have a relatively small specific surface area relative to the second metal oxide particles 2.

An average particle diameter of the second metal oxide particles may be from about 1 nanometer (nm) to about 200 nm. A lower limit of the average particle diameter of the second metal oxide particles 2 may be, for example, about 5 nm, about 10 nm, about 20 nm, about 50 nm, about 100 nm, or about 150 nm. An upper limit of the average particle diameter of the second metal oxide particles 2 may be, for example, about 200 nm, about 150 nm, about 100 nm, about 80 nm, about 50 nm, about 20 nm, or about 10 nm. A range of average particle diameter of the second metal oxide particles 2 may be determined by combining a stated lower limit and a stated upper limit. For example, the average particle diameter of the second metal oxide particles 2 may be determined in the range of about 1 nm to about 200 nm, e.g., from about 5 nm to about 10 nm, from about 20 nm to about 50 nm, or from about 150 nm to about 200 nm. Within the above range, the second metal oxide particles 2 may have greater specific surface areas, thereby adsorbing and fixing pollutants in the air with a high adsorptivity.

Based on a total weight of the first metal oxide particle 1 and the second metal oxide particles 2, an amount of the first metal oxide particle 1 may be in a range of about 0.01 weight percent (wt %) to about 50 wt %, and an amount of the second metal oxide particles 2 may be in a range of about 50 wt % to about 99.99 wt %. Accordingly, based on the total weight of the first metal oxide particle 1 and the second metal oxide particles 2, the amount of the first metal oxide particle 1 may be in a range equal to or less than about 50 wt % including equal to or less than about 30 wt % or equal to or less than about 20 wt %, for example, about 0.01 wt % or more, about 0.05 wt % or more, about 0.1 wt % or more, about 0.5 wt % or more, about 1 wt % or more, about 5 wt % or more, or about 10 wt % or more. In addition, based on the total weight of the first metal oxide particle 1 and the second metal oxide particles 2, the amount of the second metal oxide particles 2 may be in a range equal to or greater than about 50 wt %, including equal to or greater than about 70 wt % or equal to or greater than about 85 wt %, for example, about 99.99 wt % or less, about 99.95 wt % or less, about 99.9 wt % or less, about 99.5 wt % or less, about 99 wt % or less, about 95 wt % or less, or about 90 wt % or less. Within the above-described ranges, a composite photocatalyst having improved photocatalytic reactivity may be obtained.

According to an embodiment, the first metal oxide particle 1 is a micrometer-scale primary particle or a micrometer-scale secondary particle (i.e., an aggregation, agglomeration or bound grouping of two or more primary particles), the second metal oxide particle 2 may be a nanometer-scale primary particle or a nanometer-scale secondary particle, and a surface of the first metal oxide particle 1 is surrounded by a plurality of the second metal oxide particles 2.

Also, with respect to a particle shape, at least a majority (or all) of the first metal oxide particles 1 and at least a majority (or all) of the second metal oxide particle 2 may have different shapes than the other, and each independently may be described as having a spherical shape, a tubular shape, a rod shape, a fibrous shape, a sheet shape, a conical shape, a pyramidal shape, a toroidal shape, or any combined shape thereof. A "combined shape" can be, for example a hemisphere combined with a cube. Due to the different shapes of the two types of particles, light absorption efficiency of the composite photocatalyst may be more controlled.

As described above, after adsorbing pollutants in the air at room temperature, the composite photocatalyst according to an embodiment absorbs light energy with a predetermined wavelength to perform photocatalytic oxidative degradation of the pollutants into harmless substances (e.g., $H_2O$ and $CO_2$). Accordingly, adsorption and photolysis may occur simultaneously.

The composite photocatalyst may effectively degrade and remove pollutants in the air including volatile organic compounds (VOCs) via adsorption and photocatalytic degradation of the pollutants under ultraviolet (UV) light conditions.

The composite photocatalyst may be applied as a VOC gas removing module in the form of a filter mounted on various indoor and outdoor air purification devices (e.g., air purifier, air purification facility, and air conditioner) and may also be applied to indoor and outdoor air purification systems for removing fine dusts.

Furthermore, as a substance applicable for removing various gaseous pollutants, the composite photocatalyst may be applied to air purification devices and systems for removing not only VOCs but also pollutants in the air such as nitrogen oxide (NOx), sulfur oxide ($SO_x$), ammonia ($NH_3$), odor substances, microbes, pathogens, or bacteria.

Hereinafter, the present disclosure will be described in more detail with reference to the following examples and comparative examples. However, the following examples are merely presented to exemplify the present disclosure, and the scope of the present disclosure is not limited thereto.

Example 1: Preparation of BiOI—$TiO_2$ Composite Photocatalyst Structure

First, for the preparation of BiOI by solvothermal synthesis, 96 milliliters (mL) of ethylene glycol was added to a stainless steel high-temperature/high-pressure reactor (capacity: 120 mL), and 0.58 grams (g) of potassium iodide (KI) and 1.7 g of bismuth nitrate ($Bi(NO_3)_3$) were added to the reactor. The reactor was sealed and heated in a hot furnace at 160° C. for 12 hours. After cooling to room temperature, the reactor was opened and the resulting product was washed several times in a centrifuge using water and ethanol, and dried at 80° C. for 12 hours to obtain BiOI powder. $TiO_2$ powder (particle diameter: 10 nm) purchased from Ishihara Corporation (Japan) was used. 0.05 g of the recovered BiOI and 0.995 g of $TiO_2$ were added to a 250 mL round-bottom flask and sufficiently mixed with 10 mL of ethanol. The ethanol was completely removed using a rotary evaporator, to provide a BiOI—$TiO_2$ composite photocatalyst. Accordingly, the prepared BiOI—$TiO_2$ composite photocatalyst of Example 1 includes 0.5 weight percent (wt %) of BiOI and 99.5 wt % of $TiO_2$.

Example 2: Preparation of BiOI—$TiO_2$ Composite Photocatalyst Structure

A BiOI—$TiO_2$ composite photocatalyst was prepared in the same manner as in Example 1, except that the amounts of BiOI and $TiO_2$ were changed to 5 wt % and 95 wt %, respectively.

Example 3: Preparation of BiOI—$TiO_2$ Composite Photocatalyst Structure

A BiOI—$TiO_2$ composite photocatalyst was prepared in the same manner as in Example 1, except that $TiO_2$ (particle diameter: 200 nm) purchased from Ishihara Corporation (Japan) was used.

Comparative Example 1: $TiO_2$ Single Photocatalyst $TiO_2$ purchased from Ishihara Corporation (Japan) having an average particle diameter of 10 nm as used in Example 1. Accordingly, Comparative Example 1 does not include a first oxide particle as described herein.

Comparative Example 2: BiOI Photocatalyst

BiOI was prepared in the same manner as in Example 1. Accordingly, Comparative Example 2 foes not include second oxide particles as described herein.

Evaluation Example 1: TEM Analysis

Figure 4:
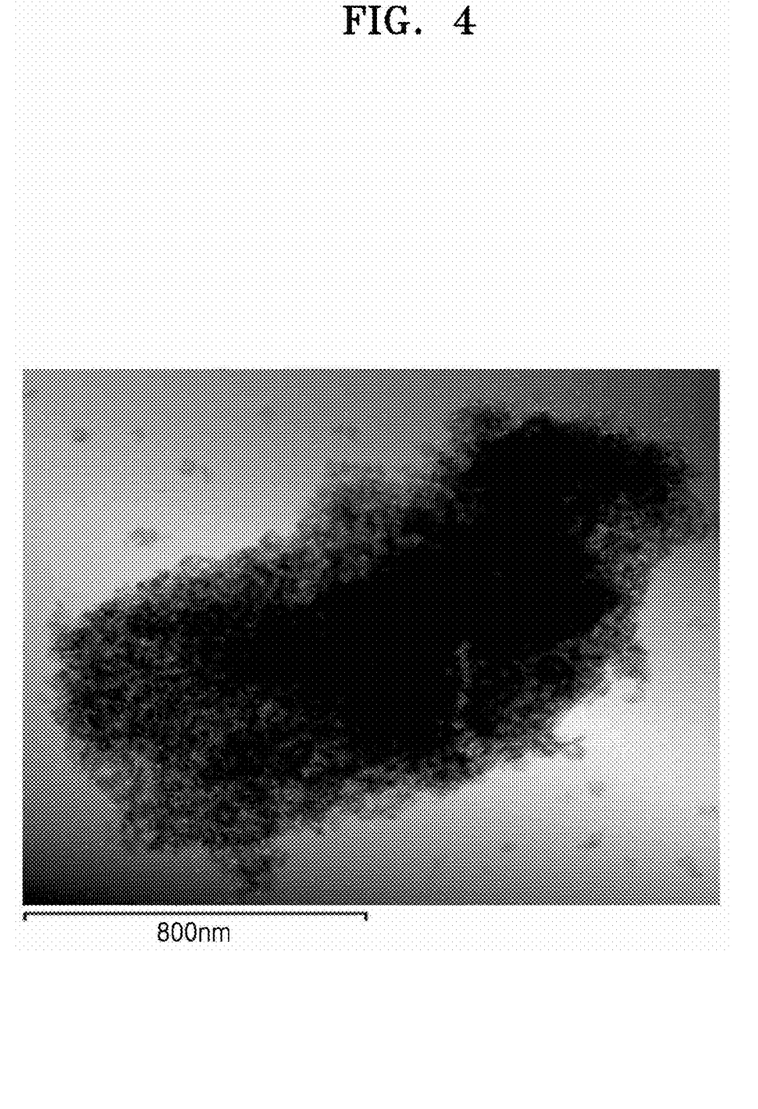
FIG. 4 is a transmission electron microscope (TEM) image of a composite photocatalyst of Example 2.

The BiOI—$TiO_2$ composite photocatalyst prepared in Example 2 was analyzed using a transmission electron microscope (TEM) and images obtained by the TEM are shown in FIG. 4. As shown in FIG. 4, the $TiO_2$ nanoparticles are present on a surface of a BiOI particle.

Evaluation Example 2: VOC Degradation Test

A VOC degradation test was performed using the composite photocatalyst prepared in Examples 1, 2, and 3 and the photocatalysts of Comparative Examples 1 and 2. The photocatalysts were compressed in the form of a disk having a diameter of 20 mm and mounted in a photoreactor made of stainless steel attached with a Quartz window. The photocatalysts were irradiates with UV light (365 nm) using an LED lamp while passing 20 ppm of a formaldehyde-air mixed gas through the photoreactor at a rate of 500 mL/min. To measure formaldehyde degradation efficiency the concentrations of $CO_2$ generated by formaldehyde degradation were measured using an FT-IR spectrometer. Degradation efficiency is calculated as provided by Equation 1 below based on a concentration of generated $CO_2$ relative to a concentration of formaldehyde (FA) flowing into the reactor, and it is assumed that the formaldehyde is converted into $CO_2$ via catalytic reaction at 100%.

$$\text{Degradation Efficiency (\%)} = C_{CO2}/C_{in} * 100 \quad \text{Formula 1}$$

Figure 5:
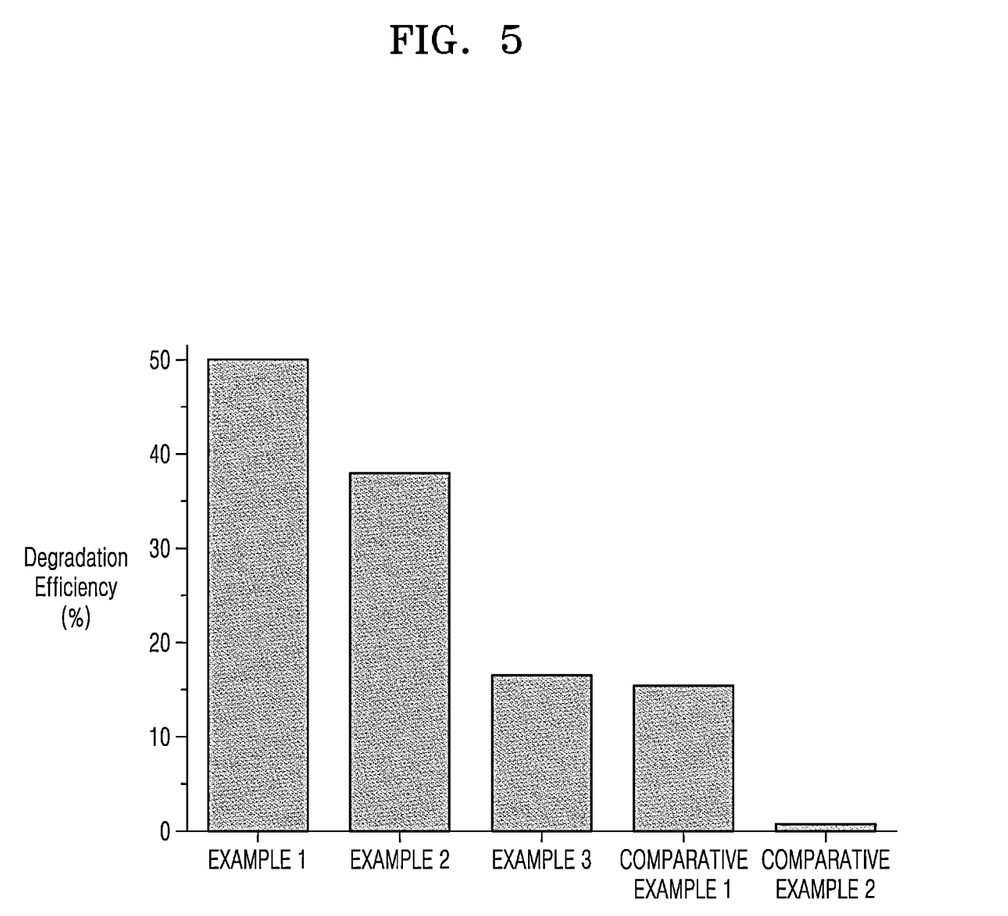
FIG. 5 is a bar graph illustrating formaldehyde degradation efficiencies of composite photocatalyst of Examples 1, 2, and 3 and photocatalysts of Comparative Examples 1 and 2.

Formaldehyde degradation efficiency was measured and the results are shown in FIG. 5 and Table 1 below. Compositions and total specific surface areas of the catalysts are also shown in Table 1.

TABLE 1

| | Composition of catalyst | Specific surface area ($m^2$/g) | Degradation efficiency (%) |
|---|---|---|---|
| Example 1 | BiOI(0.5 wt %)-$TiO_2^{(10nm)}$ | 263.6 | 49.96 |
| Example 2 | BiOI(5 wt %)-$TiO_2^{(10nm)}$ | 219.3 | 38.03 |
| Example 3 | BiOI(5 wt %)-$TiO_2^{(200nm)}$ | 14.9 | 16.47 |
| Comparative Example 1 | $TiO_2^{(10nm)}$ | 285 | 15.36 |
| Comparative Example 2 | BiOI | 55.7 | 0.63 |

As shown in FIG. 5 and Table 1, the degradation performance of the composite photocatalysts of Examples 1 and 2 exhibit an improvement in photocatalytic efficiency of about 3.25 times and about 2.47 times, respectively, compared with that of the $TiO_2$ photocatalyst of Comparative Example 1.

In addition, the composite photocatalyst having a greater average $TiO_2$ particle diameter of about 200 nm as in Example 3, exhibits a slightly greater degradation efficiency than the $TiO_2$ photocatalyst according to Comparative Example 1.

In the case of the BiOI photocatalyst of Comparative Example 2, as a visible light photocatalyst, the formaldehyde degradation performance was very poor under UV light conditions.

Figure 6:
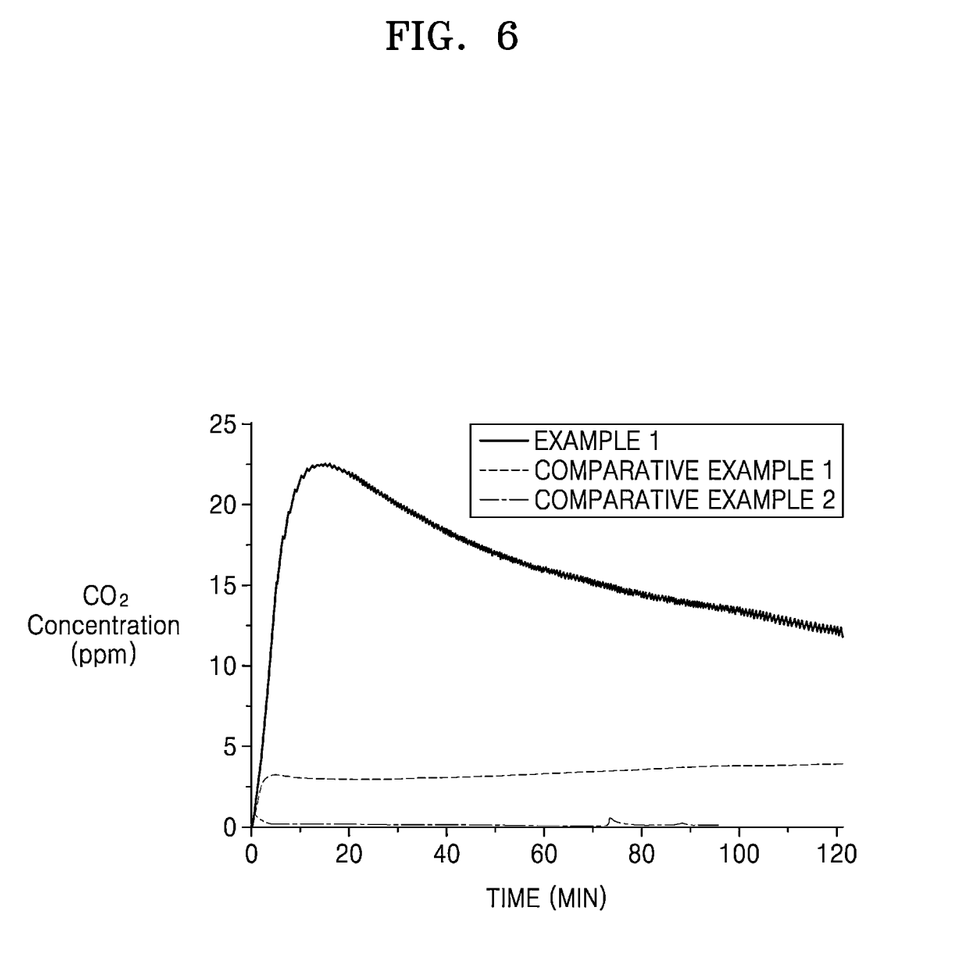
FIG. 6 is a plot illustrating $CO_2$ concentrations released from a composite photocatalyst of Example 1 over time, and $CO_2$ concentrations released from photocatalysts of Comparative Examples 1 and 2 over time.

The $CO_2$ concentrations resulting from the composite photocatalyst of Example 1, and the photocatalysts of Comparative Examples 1 and 2, were measured over time and the results are shown in FIG. 6.

As shown in FIG. 6, the composite photocatalyst of Example 1 exhibits a significant increase or improvement in formaldehyde degradation efficiency over time (2 hours) in comparison to the photocatalysts of Comparative Examples 1 and 2. Although the $TiO_2$ photocatalyst of Comparative Example 1, as an UV light photocatalyst, had a somewhat elevated initial formaldehyde degradation efficiency, which is likely due to the excellent adsorptivity of the formaldehyde to the $TiO_2$, the degradation efficiency remains significantly lower than that of Example 1. In regards to the BiOI photocatalyst of Comparative Example 2, as a visible light photocatalyst, the formaldehyde degradation efficiency is nearly zero, which is likely due the low adsorptivity of the formaldehyde to BiOI.

The composite photocatalyst structure according to an embodiment may degrade and remove gaseous pollutants such a formaldehyde under room temperature and atmospheric pressure conditions and exhibit improved photocatalytic reactivity. The composite photocatalyst structure may be applied to various indoor and outdoor air purification systems in the form of a filter.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A composite photocatalyst comprising:
   a first metal oxide particle; and
   a second metal oxide particles arranged on a surface of the first metal oxide particle,
   wherein a specific surface area of the first metal oxide particle is 90 square meters per gram or less, and a specific surface area of the second metal oxide particle is 100 square meters per gram or greater, and
   a bandgap energy of the second metal oxide particle is greater than a bandgap energy of the first metal oxide particle.

2. The composite photocatalyst of claim 1, wherein the bandgap energy of the first metal oxide particle is less than 3 electron Volts, and the bandgap energy of the second metal oxide particle is greater than 3 electron Volts.

3. The composite photocatalyst of claim 1, wherein the first metal oxide particle comprises at least one metal oxide of bismuth (Bi), vanadium (V), tungsten (W), iron (Fe), copper (Cu), nickel (Ni), silver (Ag), or an alloy metal oxides thereof.

4. The composite photocatalyst of claim 1, wherein the first metal oxide particle is undoped, or the first metal oxide particle is doped selectively with a halogen, nitrogen, sulfur, carbon, or any combination thereof.

5. The composite photocatalyst of claim 1, wherein the first metal oxide particle comprises a metal oxide represented by Formula 1:

$$BiOX \qquad \text{Formula 1}$$

wherein X is a halogen.

6. The composite photocatalyst of claim 1, wherein the second metal oxide particle comprises at least one metal oxide of titanium (Ti), zinc (Zn), zirconium (Zr), tantalum (Ta), niobium (Nb), or an alloy of metal oxides thereof.

7. The composite photocatalyst of claim 1, wherein the second metal oxide particle comprises titanium oxide.

8. The composite photocatalyst of claim 1, wherein the second metal oxide particle comprises a metal oxide undoped, or the second metal oxide is doped selectively with a halogen, nitrogen, sulfur, carbon, or any combination thereof.

9. The composite photocatalyst of claim 1, wherein an average particle diameter of the first metal oxide particle is from 0.5 micrometers to 50 micrometers, and an average particle diameter of the second metal oxide particle is from 1 nanometer to 200 nanometers.

10. The composite photocatalyst of claim 1, wherein an amount of the first metal oxide particle is in a range of 0.01 weight percent to 10 weight percent, and an amount of the second metal oxide particle is in a range of 90 weight percent to 99.99 weight percent, based on a total weight of the first metal oxide particle and the second metal oxide particle.

11. The composite photocatalyst of claim 1, wherein at least a majority of first metal oxide particles and at least a majority of second metal oxide particles have different shapes, and each independently have a spherical shape, a tubular shape, a rod shape, a fibrous shape, a sheet shape, a conical shape, a pyramidal shape, a toroidal shape or any combined shape thereof.

12. The composite photocatalyst of claim 1, wherein the first metal oxide particle is a micrometer-scale primary or secondary particle, and the second metal oxide particle is a nanometer-scale primary or secondary particle, and the surface of the first metal oxide particle is surrounded by a plurality of the second metal oxide particles.

13. The composite photocatalyst of claim 1, wherein the composite photocatalyst adsorbs a gaseous pollutant in air at room temperature, the first metal oxide particle absorbs visible light, and the second metal oxide particle absorbs ultraviolet light, which results in a photolysis of adsorbed gaseous pollutant.

14. The composite photocatalyst of claim 1, wherein the composite photocatalyst photocatalyzes in an ultraviolet wavelength range.

15. A photocatalytic filter comprising the composite photocatalyst according to claim 1.

16. An air purification device comprising the photocatalytic filter according to claim 15.

17. A composite photocatalyst comprising:
   a first metal oxide particle, and
   a second metal oxide particles arranged on a surface of the first metal oxide particle,
   wherein a specific surface area of the second metal oxide particle is greater than a specific surface area of the first metal oxide particle,
   wherein an amount of the second metal oxide particle is in a range of 85 weight percent to 99.99 weight percent, based on a total weight of the first metal oxide particle and the second metal oxide particle, and
   a bandgap energy of the second metal oxide particle is greater than a bandgap energy of the first metal oxide particle.

* * * * *